(12) United States Patent
Gammenthaler, Jr. et al.

(10) Patent No.: US 8,228,956 B2
(45) Date of Patent: Jul. 24, 2012

(54) TIME STAMP OFFSET IN DATA PACKET BUNDLING

(75) Inventors: Robert S. Gammenthaler, Jr., Frisco, TX (US); Brian Tatum, Allen, TX (US)

(73) Assignee: Alcatel Lucent, Paris (FR)

( * ) Notice: Subject to any disclaimer, the term of this patent is extended or adjusted under 35 U.S.C. 154(b) by 1024 days.

(21) Appl. No.: 11/315,544

(22) Filed: Dec. 22, 2005

(65) Prior Publication Data

US 2006/0233202 A1    Oct. 19, 2006

Related U.S. Application Data

(60) Provisional application No. 60/672,795, filed on Apr. 19, 2005, provisional application No. 60/672,796, filed on Apr. 19, 2005.

(51) Int. Cl.
*H04J 3/06* (2006.01)
(52) U.S. Cl. ........................................................ 370/516
(58) Field of Classification Search .................. 370/516, 370/252, 229, 230, 235, 241, 389
See application file for complete search history.

(56) References Cited

U.S. PATENT DOCUMENTS

| | | | | |
|---|---|---|---|---|
| 5,812,775 A * | 9/1998 | Van Seters et al. | ........... | 709/213 |
| 6,014,557 A * | 1/2000 | Morton et al. | ................ | 455/410 |
| 6,304,567 B1 * | 10/2001 | Rosenberg | ................... | 370/356 |
| 6,490,296 B2 * | 12/2002 | Shenoi et al. | ................ | 370/469 |
| 6,909,709 B2 * | 6/2005 | Mesiwala | ..................... | 370/352 |
| 7,400,656 B2 * | 7/2008 | Koguchi | ........................ | 370/516 |
| 7,415,044 B2 * | 8/2008 | Kallstenius | .................. | 370/516 |

FOREIGN PATENT DOCUMENTS

| | | |
|---|---|---|
| CN | 1547385 A | 11/2004 |
| EP | 1487160 A2 | 6/2004 |
| WO | WO0118998 A1 | 3/2001 |
| WO | WO2004023156 A1 | 3/2004 |

\* cited by examiner

*Primary Examiner* — Kwang B Yao
*Assistant Examiner* — Anh Ngoc Nguyen
(74) *Attorney, Agent, or Firm* — RG & Associates

(57) ABSTRACT

A system, method, and computer readable medium for time stamp offset in data packet bundling including filling a globally distributed time stamp based upon a globally distributed time, receiving a signal unit, resolving a difference in time between the globally distributed time stamp and the reception of the signal unit and assigning a time offset based upon the resolved time difference.

24 Claims, 3 Drawing Sheets

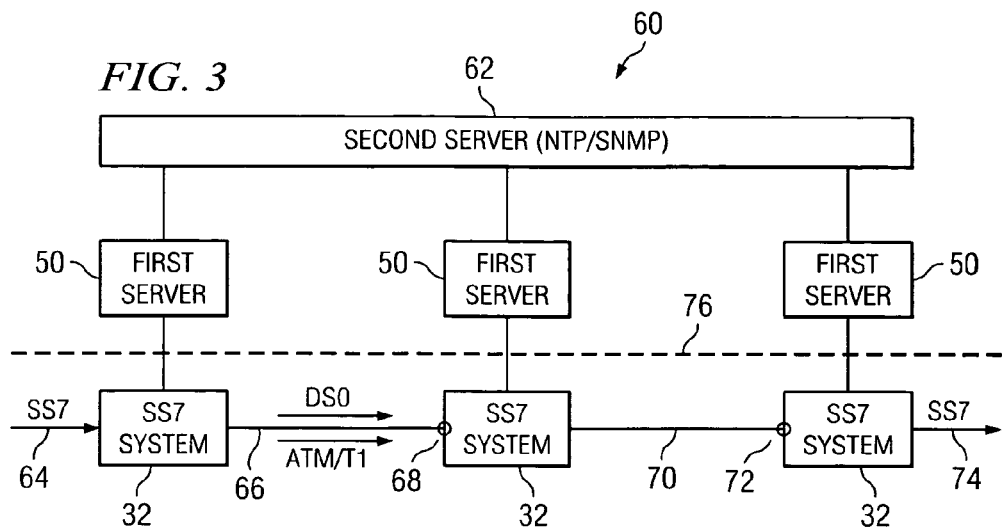
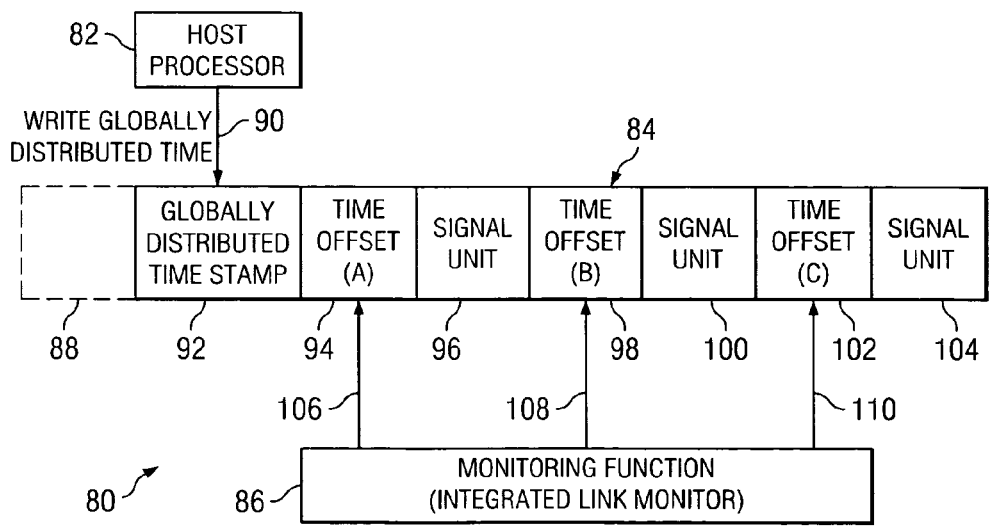

TIME STAMP OFFSET IN DATA PACKET BUNDLING

CROSS REFERENCE TO RELATED APPLICATIONS

The present patent application is related to and claims the benefit of provisional patent application No. 60/672,795, filed on Apr. 19, 2005, entitled TIME STAMP OFFSET IN DATA PACKET BUNDLING, and to provisional patent application No. 60/672,796, filed on Apr. 19, 2005, entitled CONTEXT-CONTROLLED DATA TAP UTILIZING PARALLEL HARDWARE LOGIC FOR LINK MONITORING, the entire contents of each of which are enclosed by reference herein.

The present patent application is also related to commonly assigned U.S. Patent Application 60/672,796 entitled CONTEXT CONTROLLED DATA TAP UTILIZING PARALLEL LOGIC FOR LINK MONITORING, filed on even date herewith, the entire contents of which is incorporated by reference herein.

BACKGROUND OF THE INVENTION

The present invention is generally related to synchronization of data packet bundles to globally distributed time and, more specifically to a time stamp offset in data packet bundling.

Currently, an Integrated Link Monitor (ILM) provides interactive coupling of the signaling server to a data capture system for monitoring message traffic. Message traffic consists of ILM data packet bundles comprised in part of individual signal units, which are individually stamped with a globally distributed time to synchronize the signal units across multiple monitored entities. This globally distributed time stamping of each signal unit requires processor utilization that could be used for revenue generating applications.

Therefore, what is needed is to have one globally distributed time stamp per ILM data packet bundle and stamp individual signal units with a time offset representing the difference in time between the globally distributed time and the time the signal unit was written to a circular buffer.

SUMMARY OF THE INVENTION

The Integrated Link Monitor (ILM) is used for interactive coupling of the signaling server to the data capture system for monitoring message traffic. The signaling server can be a Signaling System #7 (SS7) system such as the Alcatel Signaling Server Global (SSG). The present invention provides stamping individual signal units with a time offset representing the difference in time between the globally distributed time and the time the signal unit was written to a circular buffer. The ILM data packet bundle includes Level 2 information such as sequencing and error checking information.

In one embodiment, a method for time stamp offset in data packet bundling including filling a globally distributed time stamp based upon a globally distributed time, receiving a signal unit, resolving a difference in time between the globally distributed time stamp and the reception of the signal unit and assigning a time offset based upon the resolved time difference.

In another embodiment a method for time stamp offset in data packet bundling includes filling a globally distributed time stamp based upon a globally distributed time, receiving a signal unit, resolving a difference in time between the globally distributed time stamp and the reception of the signal unit, extracting level 2 information from the signal unit, executing level 2 functions such as sequencing and error checking, copying the signal unit to a direct memory access control function, assigning a time offset based upon the resolved time difference, assigning a bundle overhead associated with the signal unit, the bundle overhead including decoding information, information related to unbundling and source of the signal unit, bundling an integrated link monitor data packet including the globally distributed time, the signal unit, the time offset and the bundle overhead, transferring ownership of a refill portion of the circular buffer from a host processor to an integrated link monitor, loading the refill portion of the circular buffer with the received signal unit and the assigned time offset, releasing the release portion of the circular buffer to the host processor in real-time, near real-time, contemporaneously or independently with loading the refill portion of the circular buffer, transferring ownership of the release portion of the circular buffer to the integrated link monitor, receiving an notification at the host processor that the refill portion of the circular buffer is full, and swapping functionality of the release portion of the circular buffer and the refill portion of the circular buffer.

In a further embodiment, a system adapted to provide time stamp offset in data packet bundling, having a link card module wherein the link card module comprises an integrated link monitor adapted to receive a signal unit and a globally distributed time stamp based upon a globally distributed time and a timer coupled to the integrated link monitor, the timer adapted to resolve a difference in time between the reception of a signal unit and the globally distributed time stamp.

In still another embodiment, a computer readable medium comprising instructions for filling a globally distributed time stamp based upon a globally distributed time, receiving a signal unit, resolving a difference in time between the globally distributed time stamp and the reception of the signal unit, assigning a time offset based upon the resolved time difference and bundling a data packet including the globally distributed time stamp, the signal unit and the time offset.

BRIEF DESCRIPTION OF THE DRAWINGS

FIG. 3 depicts an SS7 system coupled to servers in accordance with a preferred embodiment of the present invention;

FIG. 4 depicts an integrated link monitor in accordance with a preferred embodiment of the present invention;

DETAILED DESCRIPTION OF THE INVENTION

Figure 1:
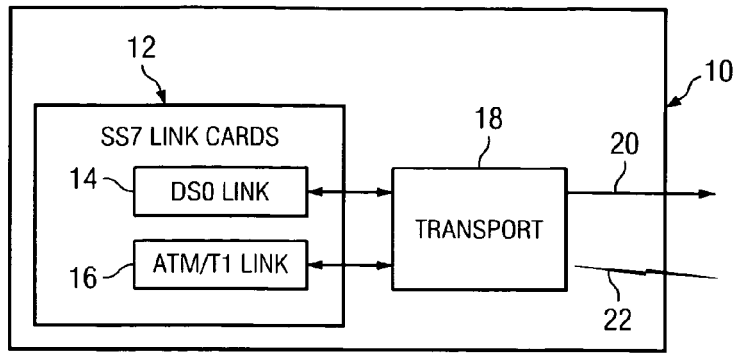
FIG. 1 depicts an SS7 system in accordance with a preferred embodiment of the present invention.

Referring now to FIG. 1, a Signaling System #7 (SS7) 10 is shown, SS7 link cards 12 including a Digital Signal Level 0 (DS-0) link card 14 and an Asynchronous Transfer Mode (ATM) T-1 link card 16. The system may include a Message Transfer Part 2 (MTP-2) link card on channelized or unchannelized T-1 or E-1, a Stream Control Transmission Protocol (SCTP) link card or any of a variety of digital link cards connected to a message transport network 18 such as an Ethernet which can communicate with a data capture system by a Local Area Network (LAN) line 20 or a wireless 22 connection that comprise the number of blocks or modules. These blocks or modules are software, hardware, firmware, and/or the combination of software, hardware, and/or firmware. The SS7 link cards 12 provide parallel processing for an Integrated Link Monitor (ILM). The integrated link monitor is used for interactive coupling of the signaling server, SS7 system, to the data capture system for monitoring of SS7 message traffic. The transfer of information between the message transport network 18 and the data capture system occurs via at least one of a wireless protocol, a wired protocol and the combination of the wireless protocol and the wired protocol.

The present invention provides stamping each signal unit bundle in a set of individual Signal Units (SU) with a time offset representing the difference in time between a globally distributed time such as Network Time Protocol (NTP) and a local time the signal unit was written to a refill portion associated with a circular buffer. The ILM extracts data from a monitored transmit and receive link. This monitored data must be correlated in time with data from across a global network. Time information is distributed globally throughout the network using the globally distributed time. This globally distributed time must then be inserted into the monitored data for time correlation of individual monitored signal units across the global network.

The ILM receives the globally distributed time and fills a globally distributed time stamp of an ILM data packet bundle. A host processor and the ILM exchange monitored packets through the circular buffer. ILM data packet bundles are assembled in the refill portion of the circular buffer by the ILM and a release portion of the circular buffer is released to the host processor for network transmission. The ILM then begins filling the refill portion of the circular buffer in real-time, near real-time, contemporaneously or independently to transmission of the release portion of the circular buffer by the host processor. To resolve the separation of the globally distributed time and a local time tracked by the ILM, a timer algorithm was developed to track time based on the release and refill operations of the circular buffer.

When the refill portion of the circular buffer is transferred to the ILM, a bundle overhead is stamped with the globally distributed time. In real-time, near real-time, contemporaneously or independently, the ILM is informed of the availability of the refill portion of the circular buffer. The ILM begins updating the time offset for this refill portion of the circular buffer. As each signal unit is appended to the circular buffer, the time offset is inserted into the bundled data stream along with the monitored signal unit. The data capture system can then compute the globally distributed time for each signal unit by adding the time offset for the signal unit to the globally distributed time provided in the bundle overhead.

The ILM virtually taps the transmit and receive data links to allow alignment of the series of signal units. Aligned signal units are copied to a Direct Memory Access (DMA) control function for assembling ILM data packet bundles in the refill portion of the circular buffer in host memory. A context controlled level 2 state machine extracts the level 2 information and performs level 2 functions such as sequencing and error checking. A context of the associated link is loaded based on the availability of an input for the link. Inputs consist of a link control from the host processor which acts as a controlling entity and a request to generate transmit data or a request to process receive data. The input is applied to the level 2 state machine which utilizes the current input and the context loaded state to produce the next state and associated outputs. The processing is performed real-time or near real-time for the associated input. The integrated link monitoring function provides a parallel logic path to copy transmit and receive ILM data packet bundles. Utilizing visibility into the state of the current context, signal unit alignment is maintained for the copied data. The direct memory access function collects the copied signal units provided from each context of the level 2 state machine, and generates bundle overhead required to decode and unbundle the data, identify the source of the data, sequence the data from the given source, and time stamp the data for correlation across multiple monitored entities.

The system adapted to provide time stamp offset in data packet bundling, having the link card module may comprise a DS-0 link card and the ATM/Ti link card, a message transfer part 2 link card on channelized or unchannelized T-1 or E-1, a stream control transmission protocol link card or any of a variety of digital link cards. The link card module having an integrated link monitor adapted to receive the signal unit and the globally distributed time stamp based upon globally distributed time and the timer coupled to the integrated link monitor. The timer is adapted to resolve a difference in time between the reception of the signal unit and the globally distributed time stamp. The integrated link monitor executes operations in parallel to the host processor. The message transport network is adapted to transfer information between the link card module and the data capture system, the transfer of the information occurs via at least one of the wireless protocol, the wired protocol and a combination of the wireless protocol and the wired protocol. A management processor is adapted to transfer information between at least one of the message transport network and the data capture system.

Figure 2:
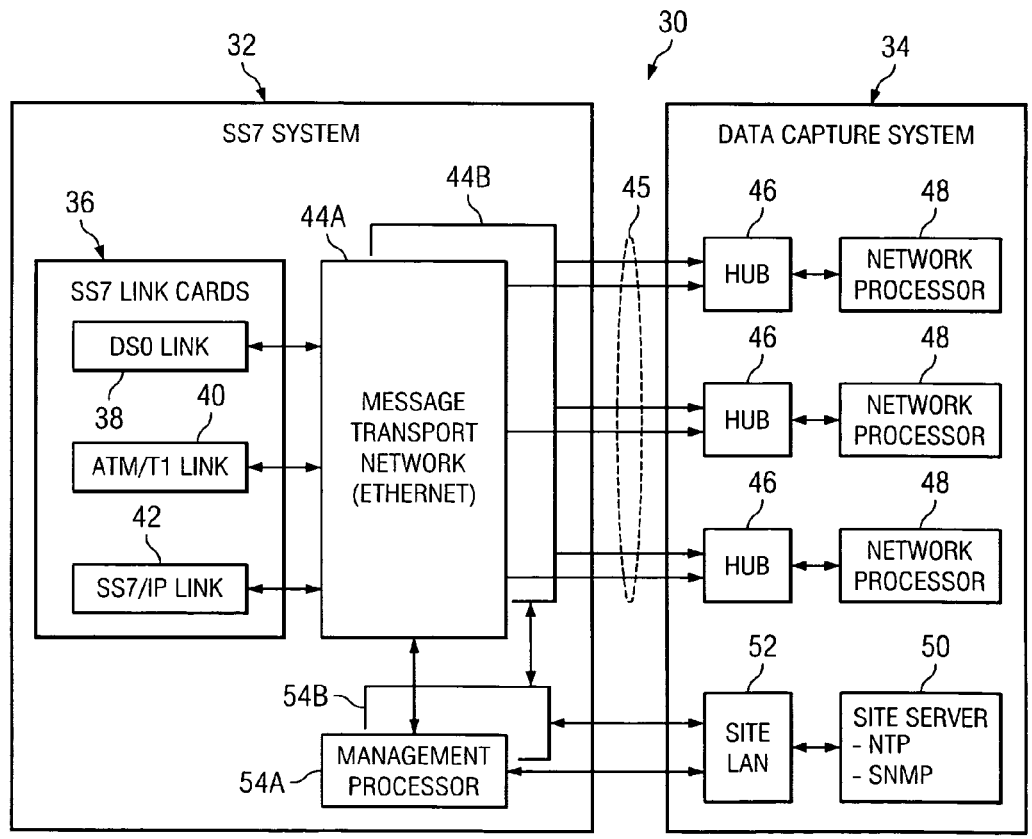
FIG. 2 depicts an SS7 system coupled to a data capture system in accordance with a preferred embodiment of the present invention.

Referring now to FIG. 2, the SS7 system 32 coupled to the data capture system 34 that comprise the number of blocks or modules. These blocks or modules are software, hardware, firmware, and/or the combination of software, hardware, and/ or firmware. The SS7 link cards 36 is shown, including the DS-0 link 38 and ATM/T-1 link 40 with and an SS7 Internet Protocol (IP) link 42 coupled to the message transport network such as the Ethernet 44A and 44B. The link card may include a message transfer part 2 link card on channelized or unchannelized T-1 or E-1, a stream control transmission protocol link card or any of a variety of digital link cards The management processors 54A and 54B are connected to the message transport network 44A and 44B which can communicate with the data capture system 34 via the local area network 52. The management processors are responsible for transmitting link status, link configuration and system status to the data capture system 34. The blocks in the SS7 system 32 perform the similar functionality to their respective blocks in the SS7 system 10. The message transport network 44A and 44B are coupled to management processors 54A and 54B. Globally distributed time information is received across the site LAN 52. The management processor 54A and 54B synchronize time utilizing the globally distributed time provided by a first server 50. The hub 46 is coupled 45 to the message transport network 44A and 44B, the hub 46 is also connected to the network processor 48.

Referring now to FIG. 3, the SS7 system is shown coupled to the first servers 50, which in turn are coupled to the second server 62 that comprise the number of blocks or modules. These blocks or modules are software, hardware, firmware, and/or the combination of software, hardware, and/or firmware. The SS7 system 32 is connected by links 64, 66, 70 and 74 to the message transport network. A set of monitoring links 68 and 72 provide virtual taps to extract transmit and receive level 2 information to be received by the data capture system.

Referring now to FIG. 4, the ILM data packet bundle 84 that comprise the number of blocks or modules is shown. These blocks or modules are software, hardware, firmware, and/or the combination of software, hardware, and/or firmware. The ILM data packet bundle 84 is comprised of bundle overhead 88, the globally distributed time stamp 92, the signal unit 96 and a time offset stamp 94. The time offset stamp 94 represents the difference in time between the globally distributed time stamped at the beginning of refill of the ILM data packet bundle and the local time that the individual signal unit was written to the ILM data packet bundle. The host processor 82 transmits the globally distributed time 90 to annotate the globally distributed time stamp 92 at the beginning of assembly of the ILM data packet bundle. The globally distributed time 90 is also referred to as full globally distributed time, and the globally distributed time stamp 92 is also referred to as the globally distributed time stamp. The bundle overhead 88 added to the ILM data packet bundle contains level 2 information for sequencing and error checking. The monitoring function 86 adds the time offset stamps 94, 98 and 102 based on the time offsets 106, 108 and 110 to the ILM data packet bundle. The order of the time offset stamps and the signal units can vary. The context of the signal units are written to the bundle overhead.

Figure 5:
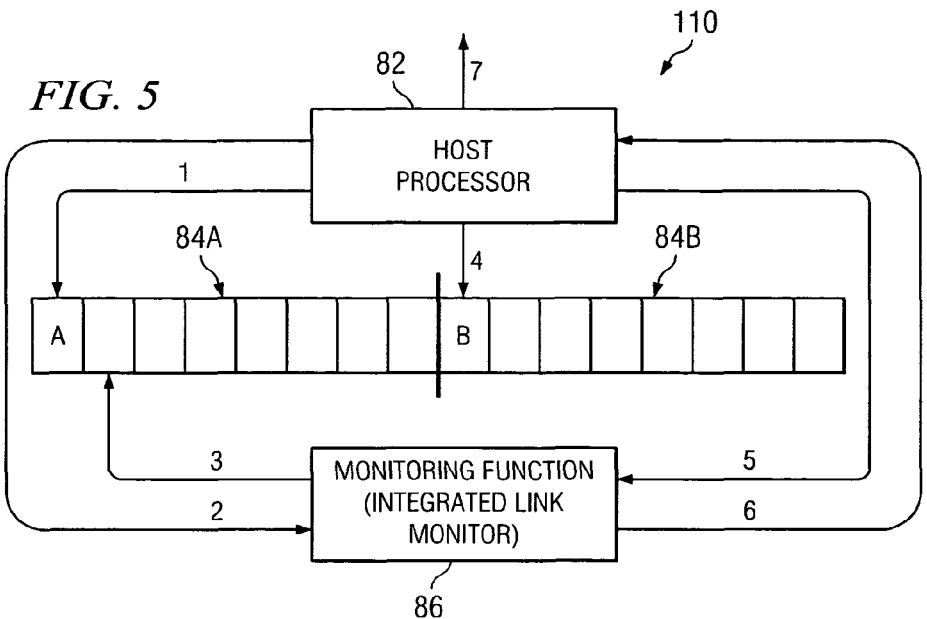
FIG. 5 depicts an integrated link monitor, integrated link monitor data packet bundle and host processor in accordance with a preferred embodiment of the present invention.

Referring now to FIG. 5, the transfer of ILM data packet bundles release portion 84A and refill portion 84B between the host processor 82 and the monitoring function 86 that comprise the number of blocks or modules will be described. These blocks or modules are software, hardware, firmware, and/or the combination of software, hardware, and/or firmware. The host processor 82 fills 1 the globally distributed time stamp A into ILM data packet bundle release portion 84A being assembled in the refill portion of the circular buffer. The host processor 82 transfers ownership 2 in real-time, near real-time, contemporaneously or independently to the refill portion of the circular buffer to the monitoring function 86. After ownership of the refill portion of the circular buffer is transferred to the monitoring function the timer is queried and the ILM begins to fill 3 the refill portion 84B of the circular buffer with received signal units and time offset stamps utilizing the direct memory access control function for copied signal units. The ILM resolves the difference in time between the globally distributed time stamp and the local time the signal unit was written to the refill portion of the circular buffer. The ILM assigns the time offset for the signal unit. The ILM extracts level 2 data associated with the signal unit. The release portion 84A of the circular buffer is released 4 to the host processor 82 while the refill portion 84B of the circular buffer is under ownership of the ILM. Bundle overhead is assigned by the ILM and includes decoding information, information related to unbundling and source of the signal unit related information. The data packet is bundled including the globally distributed time, the signal unit, time offset and bundle overhead. The refill portion of the circular buffer is loaded with the received signal unit, the assigned time offset and the bundle overhead. After the information in the release portion of the circular buffer is transferred to the host processor, ownership of the release portion of the circular buffer is transferred 5 to the monitoring function 86. The releasing of the release portion of the circular buffer to the host processor is in real-time, near real-time, contemporaneously or independently with loading the refill portion of the circular buffer. The notification 6 from the monitoring function 86 is received by the host processor 82 to tell the host processor that the refill portion of the circular buffer is full. The data from the refill portion of the circular buffer to the data capture system is received 7 from the host processor 72. At this point the refill portion of the circular buffer and the release portion of the circular buffer swap functionality in real-time, near real-time, contemporaneously or independently. This system can include multiple circular buffers, integrated link monitors and host processors.

Figure 6:
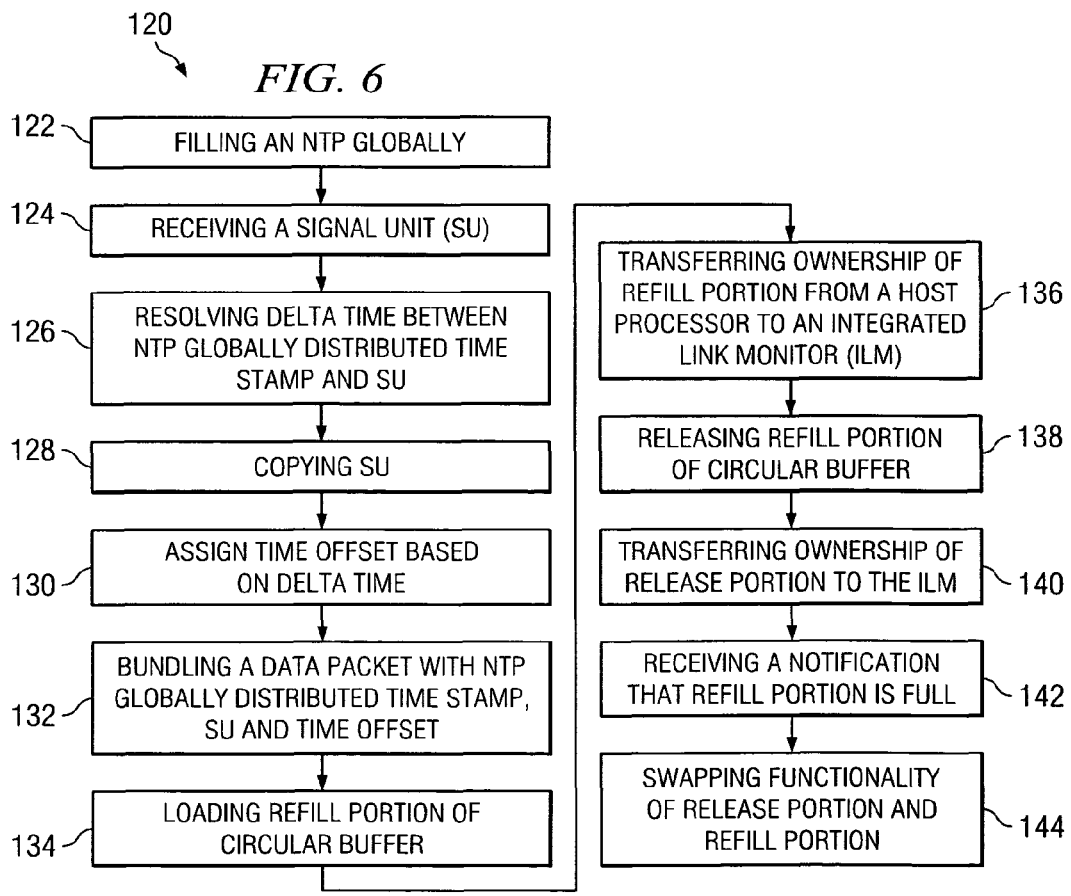
FIG. 6 depicts a flow chart for time stamp offset in data packet bundling in accordance with a preferred embodiment of the present invention.

Referring now to FIG. 6, a method 120 for time stamp offset in data packet bundling includes filling 122 the globally distributed time stamp, receiving 124 the signal unit and resolving 126 the difference in time between the globally distributed time stamp and the reception of the signal unit. The signal unit is copied 128 to the direct memory access control function. A time offset is assigned 130 based upon the resolved time difference between the globally distributed time and the local time that the signal unit was written to the refill portion of the circular buffer. Bundle overhead associated with the signal unit is assigned wherein the bundle overhead includes decoding information, information related to unbundling and source of the signal unit. The data packet is bundled 132 including the globally distributed time, the signal unit, the time offset and bundle overhead. The refill portion of the circular buffer is loaded 134 with the received signal unit and the assigned time offset. Ownership of the refill portion of the circular buffer is transferred 136 from the host processor to the integrated link monitor. The release portion of the circular buffer is released 138 to the host processor in real-time, near real-time, contemporaneously or independently with loading the refill portion of the circular buffer. Ownership of the release portion of the circular buffer is transferred 140 to the integrated link monitor. The notification is received 142 at the host processor that the refill portion of the circular buffer is full and functionality of the release portion of the circular buffer and the refill portion of the circular buffer are swapped 144.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the management processor, first server or network processor modules. Also, these capabilities may be performed in the current manner or in the distributed manner and on, or via, any device able to track time. Further, although depicted in the particular manner, various blocks may be repositioned without departing from the scope of the current invention. For example, the management processor could be integrated within the SS7 link cards. Still further, although depicted in the particular manner, the greater or lesser number of SS7 link cards, management processors, message transport networks, integrated link monitors, hubs, network processors, local area networks or first servers could be utilized.

Further, a lesser or greater number of ILM data packet bundles may be utilized with the present invention and such ILM data packet bundles may include complementary information in order to accomplish the present invention, to provide additional features to the present invention, and/or to make the present invention more efficient.

What is claimed is:

1. A method for time stamp offset calculation in data packet bundling by extracting and transmitting information from a host server, comprising: filling a globally distributed time stamp based upon a globally distributed time received from a host processor associated with the host server; receiving a signal unit via a management processor; resolving a difference in time between the globally distributed time stamp and a local time the signal unit was written to a circular buffer and calculating a time stamp offset based on the resolved time difference; and assigning the time stamp offset to the signal unit, based upon the resolved time difference by adding the time stamp offset to an integrated link monitor (ILM) data packet bundle which comprises the signal unit, the globally distributed time stamp, a bundle overhead and the time stamp offset.

2. The method of claim 1 comprising loading a refill portion of the circular buffer with the received signal unit, the assigned time offset, and the globally distributed time stamp.

3. The method of claim 2 comprising transferring ownership of the refill portion associated with the circular buffer from the host processor to an integrated link monitor, wherein the host processor and the integrated link monitor communicate via the circular buffer.

4. The method of claim 3 comprising releasing a release portion of the circular buffer to the host processor, wherein the releasing of the release portion occurs in at least one of the following: in real-time; in near real-time; contemporaneously; and independently with loading the refill portion of the circular buffer.

5. The method of claim 4 comprising transferring ownership of the release portion of the circular buffer to the integrated link monitor.

6. The method of claim 5 comprising receiving a notification at the host processor that the refill portion of the circular buffer is full.

7. The method of claim 6 comprising swapping functionality of the release portion of the circular buffer and the refill portion of the circular buffer in at least one of the following: real-time; near real-time; contemporaneously; and independently.

8. The method of claim 1 comprising extracting level 2 information from the signal unit.

9. The method of claim 1 comprising bundling a data packet associated with the integrated link monitor with the globally distributed time, the signal unit and the time offset.

10. The method of claim 1 comprising assigning a bundle overhead associated with the signal unit.

11. The method of claim 10 wherein the bundle overhead includes information associated with the data packet.

12. The method of claim 10 wherein the bundle overhead includes decoding information related to the data packet.

13. The method of claim 10 wherein the bundle overhead includes information related to unbundling the data packet.

14. The method of claim 10 wherein the bundle overhead includes source of the signal unit.

15. The method of claim 1 comprising copying the signal unit to a direct memory access control function.

16. A method for time stamp offset calculation in data packet bundling, comprising: filling a globally distributed time stamp based upon a globally distributed time received from a host processor associated with a host server; receiving a signal unit via a management processor; resolving a difference in time between the globally distributed time stamp and a local time the signal unit was written to a circular buffer and calculating a time stamp offset based on the resolved time difference;

assigning a time offset to the signal unit, based upon the resolved time difference by adding the time stamp offset to an integrated link monitor (ILM) data packet bundle which comprises the signal unit, the globally distributed time stamp, a bundle overhead and the time stamp offset; and extracting level 2 information from the signal unit.

17. The method of claim 16 comprising:
copying the signal unit to a direct memory access control function;
assigning a bundle overhead associated with the signal unit, the bundle overhead including decoding information, bundle overhead including information related to unbundling, bundle overhead including source of the signal unit related information, bundle overhead including a globally distributed time; and
bundling data packets including the signal units, the time offsets and the bundle overhead.

18. The method of claim 17 comprising:
loading the refill portion of the circular buffer with the received signal unit and the assigned time offset;
transferring ownership of a refill portion of the circular buffer from the host processor to an integrated link monitor;
releasing the release portion of the circular buffer to the host processor concurrent with loading the refill portion of the circular buffer;
transferring ownership of the release portion of the circular buffer to the integrated link monitor;
receiving a notification at the host processor that the refill portion of the circular buffer is full; and
swapping functionality of the release portion of the circular buffer and the refill portion of the circular buffer.

19. A system to provide time stamp offset calculation in data packet bundling by extracting and transmitting information from a host server, comprising: a link card module, wherein the link card module comprises: an integrated link monitor to receive a signal unit and a globally distributed time stamp based upon a globally distributed time via a management processor; a timer coupled to the integrated link monitor, the timer to resolve a difference in time between a local time the signal unit was written to a circular buffer and the globally distributed time stamp and used to calculate a time stamp offset based on the resolved time difference; and a processor coupled to the timer, the processor to assign a time offset to the signal unit; based upon the resolved time difference by adding the time stamp offset to an integrated link monitor (ILM) data packet bundle which comprises the signal unit, the globally distributed time stamp, a bundle overhead and the time stamp offset.

20. The system of claim 19 wherein the integrated link monitor executes operations in parallel to the host processor.

21. The system of claim 19 comprising: a message transport network to transfer information between the link card module and a data capture system.

22. The system of claim 21 wherein the transfer of the information occurs via at least one of: a wireless protocol; a wired protocol; and a combination of a wireless protocol and a wired protocol.

23. The system of claim 20 comprising a management processor to transfer information between at least one of: a globally distributed time stamp distribution system; and the data capture system.

24. A non-transitory computer readable storage medium comprising instructions for: filling a globally distributed time stamp based upon a globally distributed time by extracting level 2 information from a host server; receiving a signal unit via a management processor; resolving a difference in time between the globally distributed time stamp and a local time the signal unit was written to a circular buffer and calculating a time stamp offset based on the resolved time difference;
assigning a time offset to the signal unit, based upon the resolved time difference adding the time stamp offset to an integrated link monitor (ILM) data packet bundle which comprises the signal unit, the globally distributed time stamp, a bundle overhead and the time stamp offset; and bundling a data packet including the globally distributed time stamp, the signal unit, and the assigned time offset.

* * * * *